Figures 5, 6:
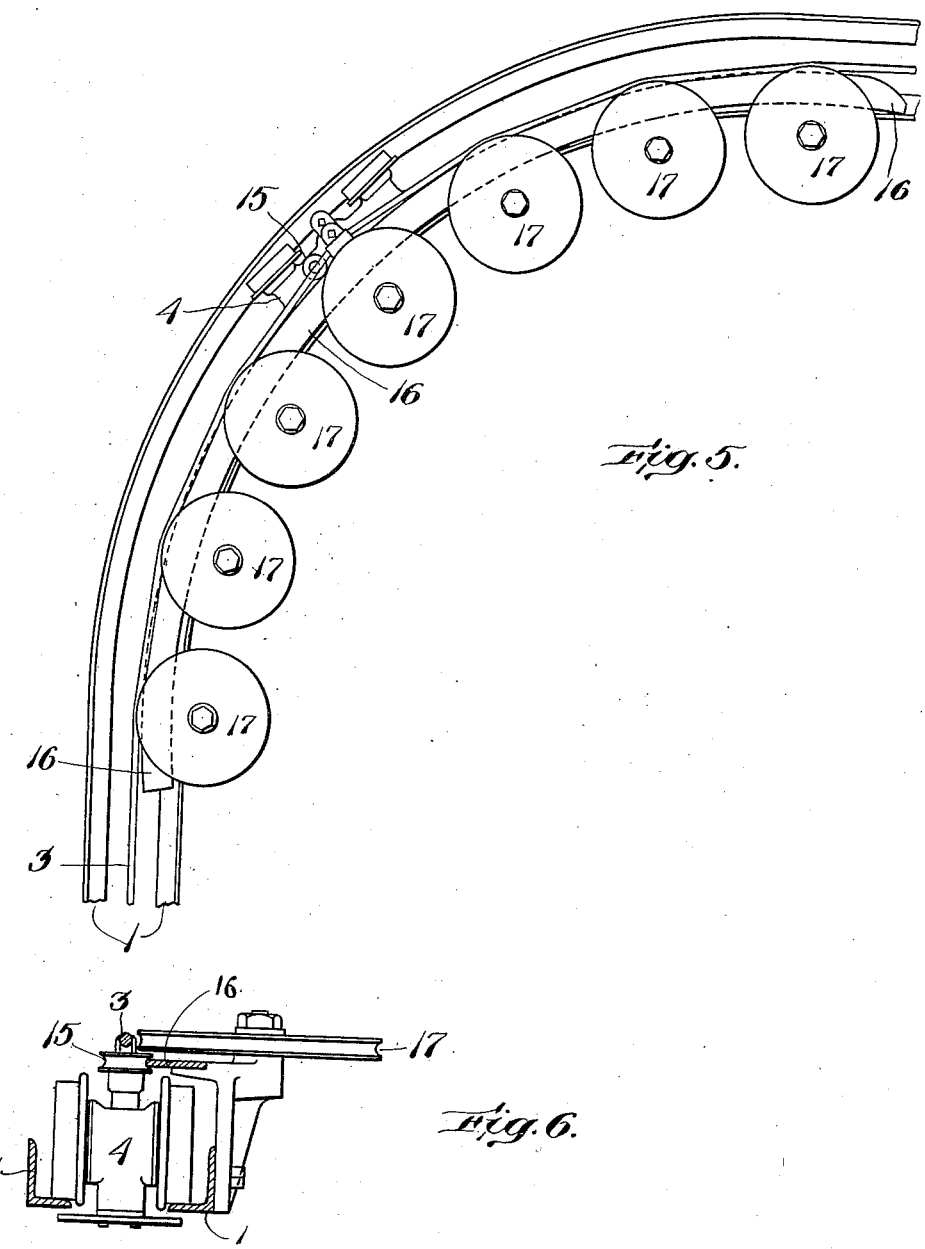

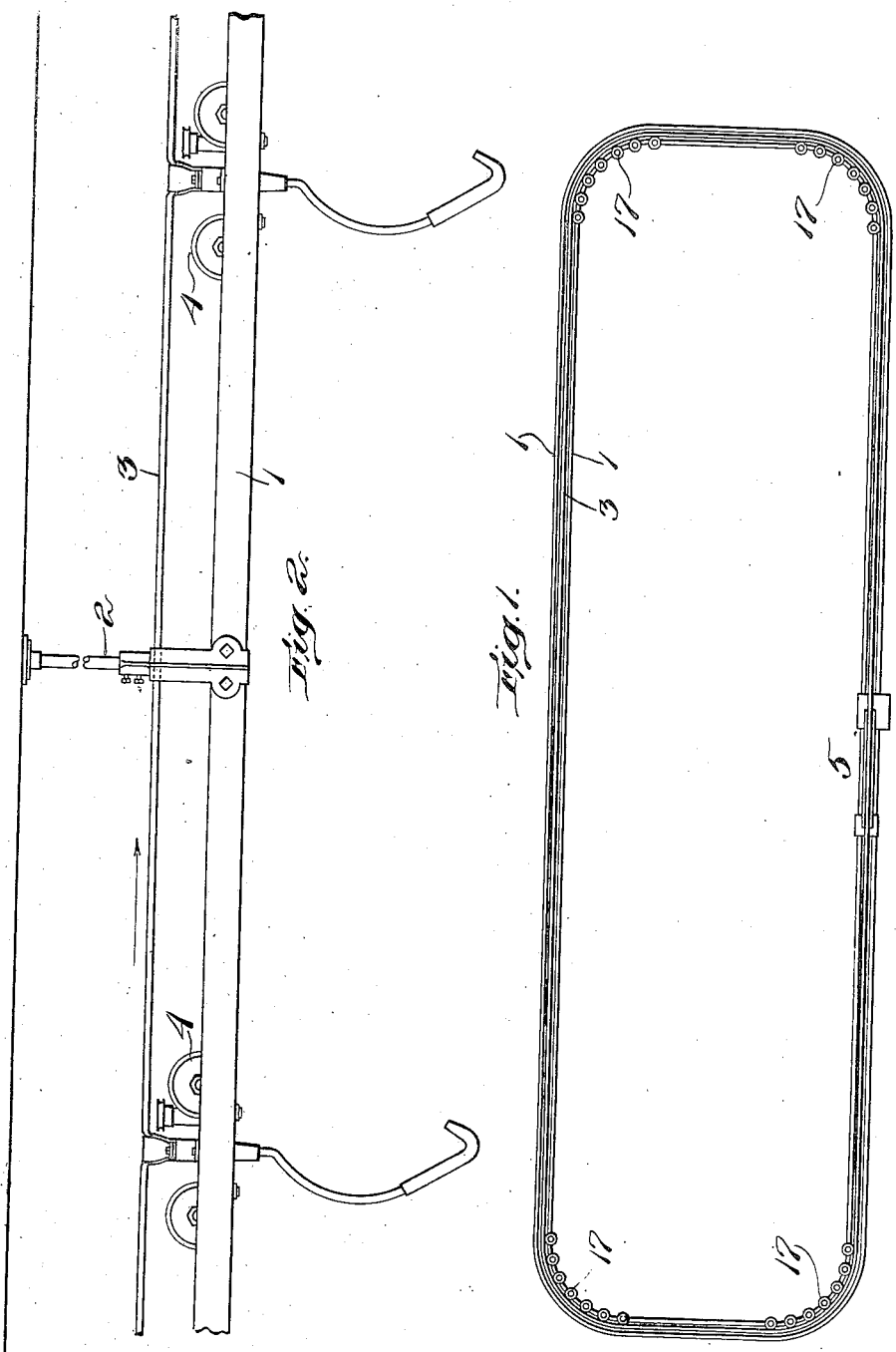

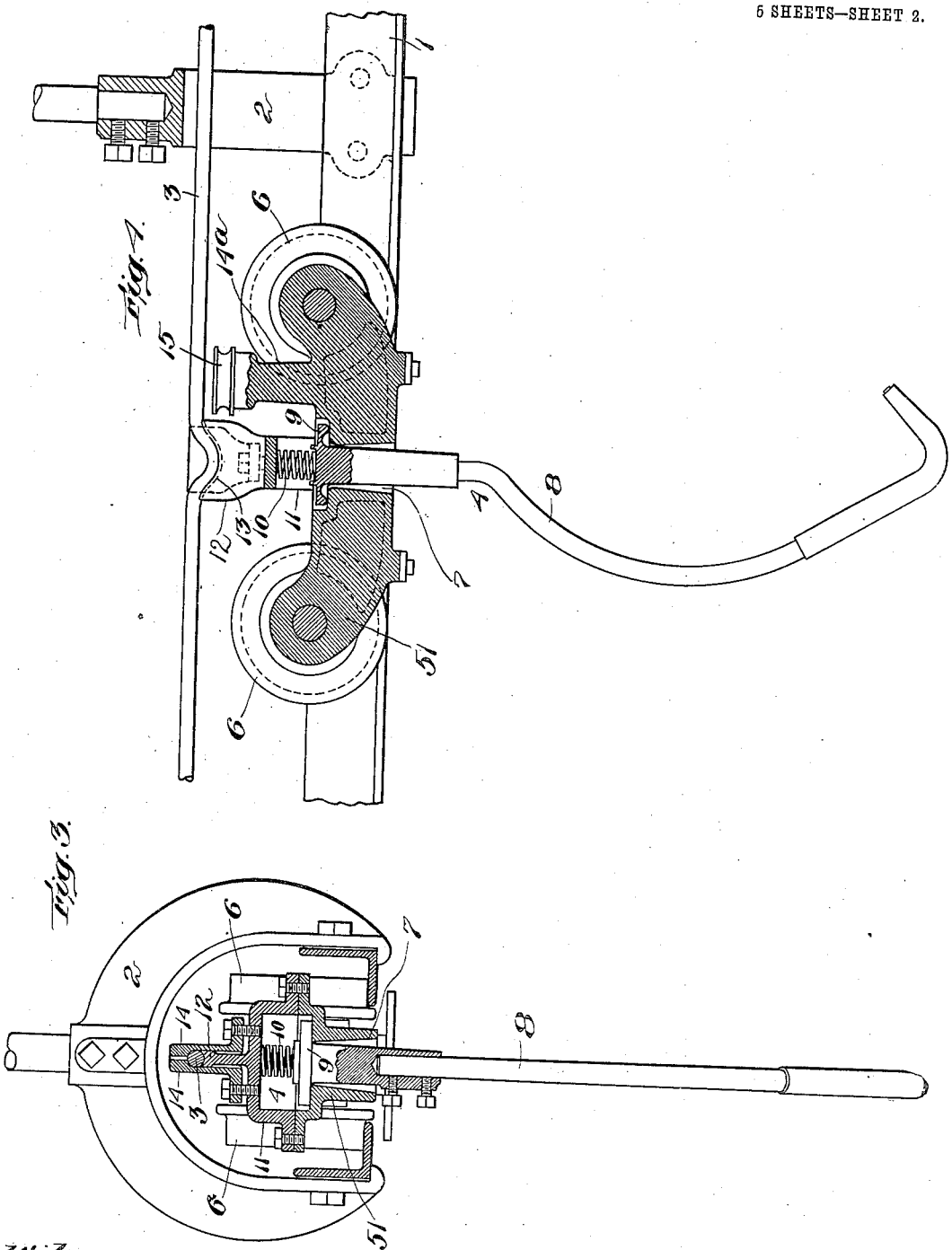

J. T. COWLEY.
CONVEYING APPARATUS.
APPLICATION FILED SEPT. 12, 1906.

923,337

Patented June 1, 1909.
5 SHEETS—SHEET 3.

Witnesses:

Inventor:

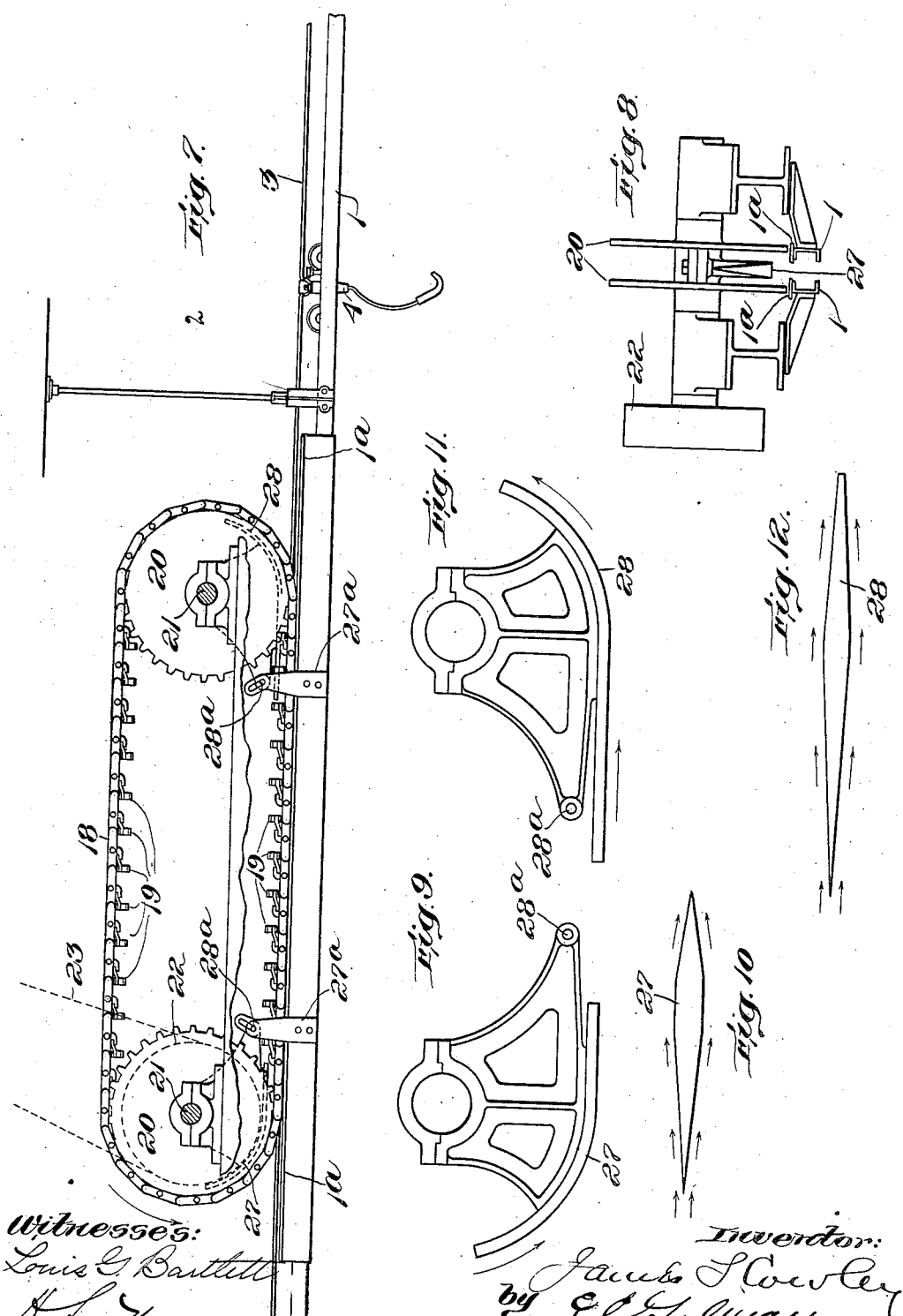

J. T. COWLEY.
CONVEYING APPARATUS.
APPLICATION FILED SEPT. 12, 1906.
923,337.
Patented June 1, 1909.
5 SHEETS—SHEET 5.
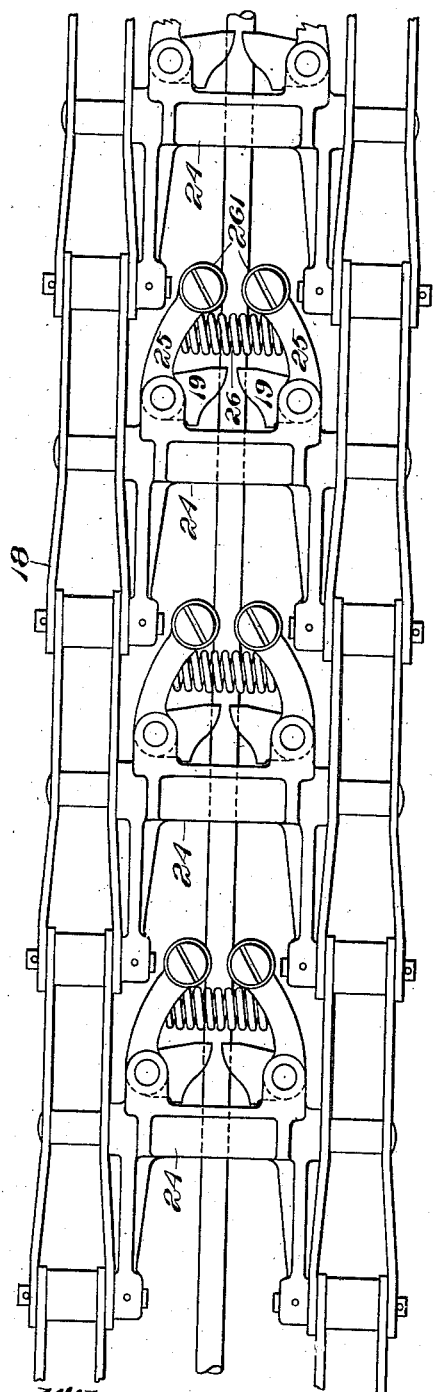
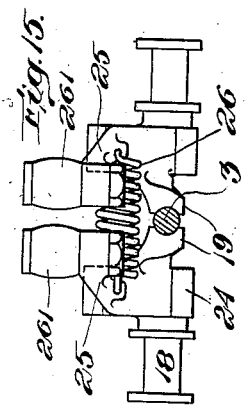
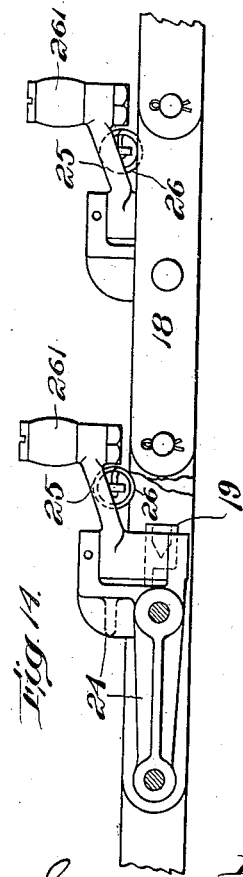
Witnesses:
Louis G. Bartlett
Inventor:
James T. Cowley
by
Attorneys

UNITED STATES PATENT OFFICE.

JAMES T. COWLEY, OF BOSTON, MASSACHUSETTS, ASSIGNOR TO LAMSON CONSOLIDATED STORE SERVICE COMPANY, OF NEWARK, NEW JERSEY, A CORPORATION OF NEW JERSEY.

CONVEYING APPARATUS.

No. 923,337.　　　　Specification of Letters Patent.　　　Patented June 1, 1909.

Application filed September 12, 1906. Serial No. 334,267.

*To all whom it may concern:*

Be it known that I, JAMES T. COWLEY, of Boston, in the county of Suffolk and State of Massachusetts, have invented certain new and useful Improvements in Conveying Apparatus, of which the following is a specification.

This invention relates to apparatus for conveying chairs and the like from one point to another.

The object of the invention is to provide a simple apparatus of the kind referred to which will be particularly adapted to transport chairs and the like considerable distances.

In the accompanying drawings Figure 1 is a diagram of an apparatus for conveying chairs and the like; Fig. 2 is an elevation of a portion of my improved apparatus showing the cable, the tracks and two of the carriers hereinafter described; Figs. 3 and 4 are details of the carriage; Figs. 5 and 6 are details showing the construction of the apparatus at the turns or bends in the track; Figs. 7 and 8 show the cable driving mechanism of my improved apparatus; Figs. 9, 10, 11 and 12 are details of the cams of the cable driving apparatus shown in Figs. 7 and 8; and Figs. 13, 14 and 15 show the construction of the driving chain of the mechanism shown in the Figs. 7 and 8.

Referring to the drawings, 1 represents an endless track supported at intervals throughout its length by hangers 2 fastened to the ceiling or other fixture of the building within which the apparatus is arranged. Above track 1 is an endless cable 3 supported at intervals throughout its length by carriages or chair carriers 4, traveling on the track 1.

At 5 in Fig. 1 is indicated the driving mechanism shown in Fig. 7, which mechanism drives the cable 3 so as to propel the carriers along the track 1. The track 1 is in most part made up of two angle irons fixed to the lower ends of the yokes of hangers 2, said yokes being large enough to permit the passage through them of the cable and the carriers carried thereby, the wheels of the carriers 4 being supported by the inwardly projecting flanges of the angle irons forming tracks 1.

As shown in Figs. 3 and 4 each carrier comprises a body 51 supported by four wheels 6. At the middle of the body 51 is an aperture 7 through which extends the shank of a chair holder 8, herein shown as a hook. At its upper end the hook 8 is made with a head 9 resting on the top of the body 51 and yieldingly held against rocking on said body by a spring 10. The lower end of the hook 8 is adapted to engage the chair or other article the apparatus is to handle, and is covered with rubber to prevent injury to the article. Fixed to the top of the body 51 is a bracket 11, having an upwardly extending tongue 12 made on its top face with a socket 13 into which the cable 3 is bent and rigidly held by clamps 14 secured to the bracket 11. In this fashion the carriage is fastened securely to the cable so as to move with the latter. Projecting from the top side of the carriage 4 is a post 14$^a$ carrying at its upper end a loose roll 15 to coöperate with an auxiliary rail 16 that is provided at the bends in the track, shown in Figs. 5 and 6.

In Fig. 1 of the drawings four bends are shown in the track, and at each of these bends the curve is of large radius, and instead of using a large shive of corresponding radius, which would occupy more room than desirable, I employ a series of small shives 17 at each bend arranged substantially parallel to the bend in the rails to laterally support the cable at these points. The auxiliary rail 16 is arranged below the shives 17 in position to engage the rolls 15 on the carriages 4 so as to hold the clamps 14 out of contact with the shives 17, as the carriages pass around the bends. The auxiliary rail 16 extends only from the beginning of the bend to the ending of the latter, as shown in Fig. 5.

The purpose of employing the curved series of small shives 17 instead of a single shive as heretofore, is that with a single small shive the radius of the bend is necessarily short and therefore the bend is abrupt, so that the resistance which these bends offer to the movement of the cable 3 is much greater where a single shive is employed than where a curved series, such as I have described, is employed. With the latter the radius of the curve is not limited and can be made so large as to greatly reduce the resistance which the bend offers to the movement of the cable. This is particularly desirable where the cable is of great length, as in the present instance, and where there may be many turns and bends in the track, and economy of space is desirable.

The mechanism for driving the cable 3, as shown in Figs. 7 to 15 inclusive, comprises an endless chain or gripper carrier 18 on which is mounted a series of grippers 19. The chain 18 is mounted on four sprocket wheels 20 carried by shafts 21 journaled in bearings on any suitable fixture. One of these shafts may have power applied to it in any suitable manner. Herein I have shown a pulley 22 fix 1 to one of said shafts and driven by a belt indicated by dotted lines at 23. The chain 18 is driven in the direction indicated by the arrow in Fig. 7, and the grippers are brought down into engagement with the cable, and then travel for a considerable distance along with the cable to the other pair of sprockets, where they leave the cable and return to the first point again. The grippers 19, as shown in Fig. 13 are pivoted on brackets 24, and have arms 25 connected by a spring 26, which serves to hold the two jaws of each gripper together. The arms 25 carry rolls 261 which coöperate with cams 27 and 28 placed in the path of said rolls, so that each gripper is opened by cam 27 as it descends toward the cable, and as soon as the gripper passes said cam it is closed on to the cable by spring 26 and remains in engagement with said cable until the cam 28 opens the gripper, which occurs just before the gripper is shifted away from the cable by the passage of the chain 18 around the sprockets shown at the right hand of Fig. 7. Development of the two cams 27 and 28 are shown in Figs. 10 and 12 respectively, and the arrows in said figures show the paths of the rolls 261. These cams 27 and 28 are wedge-shaped and positioned so as to pass between the two rolls 261 of each gripper as the latter travels with the carrier 18. The cams 27 and 28 also are hung on the shafts 21 and held rigidly in place by brackets 27$^a$, to which the cams are fastened at 28$^a$.

That portion of track 1 in the immediate neighborhood of the chain 18 is made up, as shown in Fig. 8, of two channel irons on the top of each of which is fixed a steel plate 1$^a$. These two plates serve to support the lower stretch of the chain 18 that extends between the two sets of sprockets. The lower flanges of the channel irons serve as tracks for the wheels of the carriages 4, which latter pass between the two channel irons. By this peculiar driving mechanism a much more powerful grip is obtained on the cable 3 than is possible with a single driving shive or drum, and therefore this mechanism is particularly adapted to drive a very long cable where the resistance and load is great.

Having thus described my invention without attempting to set forth all the forms in which it may be embodied, or all the uses to which it may be applied, what I claim is:

1. In a conveying apparatus the combination with the cable, of cable propelling mechanism comprising a traveling gripper carrier and normally held in a closed position; grippers mounted on the carrier; and means independent of the carrier adapted to control the grippers so as to open said grippers to grip the cable as they approach the same, and to open said grippers to free the cable, as they leave the same; and means to operate the carrier.

2. In a conveying apparatus the combination with the cable, of cable propelling mechanism comprising a traveling gripper carrier and normally held in a closed position; grippers mounted on said carrier; two cams in the path of the grippers, one for opening said grippers as the latter are brought into engagement with the cable, and the other for opening the grippers when the latter are carried away from the cable, and means to operate the carrier.

3. In a conveying apparatus the combination with the cable, of cable propelling mechanism comprising a traveling gripper carrier; a plurality of spring controlled grippers mounted on said carrier and each normally held in a closed position; two cams arranged in the path of said grippers, one for opening the grippers as they are brought into engagement with the cable and the other for opening the grippers when they are moved away from the cable, and means to operate the carrier.

4. In a conveying apparatus the combination with the cable, of cable propelling mechanism comprising a traveling gripper carrier; a plurality of gripper jaws pivotally mounted on the carrier; arms connected with said jaws; two cams arranged in the path of said arms, one for separating said arms to open the gripper jaws as the latter approach the cable and the other for separating said arms to open the gripper jaws as the latter leave the cable.

5. In a conveying apparatus the combination with the cable, of cable propelling mechanism comprising a traveling gripper carrier; gripper jaws pivotally mounted on said carrier and arranged in pairs to receive the cable between them; arms connected with said jaws; two cams arranged in the path of said arms, one for momentarily spreading said arms and the jaws connected therewith as the latter approach the cable, and the other for momentarily spreading said arms and the jaws connected therewith as the latter leave the cable, and means to operate the carrier.

6. In a conveying apparatus the combination with an endless cable; driving mechanism for said cable; carriers attached to said cable; an endless track alongside the cable for supporting the carriers; means to support the cable laterally at the bends in the track, and an auxiliary rail at said bends for engaging and guiding the carriers around the bends.

7. In a conveying apparatus the combination with an endless cable; driving mechanism for said cable; carriers attached to said cable; and an endless track alongside the cable for supporting the carriers; means to support the cable laterally at the bends in the track, and an auxiliary rail at said bends for engaging and guiding the carrier around the bends so as to hold the carrier clear of said cable supporting means.

8. In a conveying apparatus the combination with the cable and track, of a carrier mounted on the latter, made with a socket through which the cable extends, and having clamps to bend and fix the cable in said socket.

9. In a conveying apparatus the combination with the cable and track, of a carrier mounted to travel on the track; an aperture through said carriage; a chair holder or the like extending through said aperture and made at its upper end with a head resting upon the top rim of said aperture, and a spring for yieldingly holding the said head against rocking movement on the carrier.

10. In a conveying apparatus the combination with the cable and a curved track, of a carrier mounted on the track and attached to the cable; a series of guide shives alongside of the track and parallel therewith for supporting the cable laterally, and an auxiliary rail alongside of the track for engaging the carriage and holding the latter clear of said shives.

11. A driving chain for cables made up of links arranged in opposite rows and carrying pairs of cable gripping jaws adapted to lodge and prevent the slipping of the cable when in engagement therewith; a spring for holding each pair of jaws normally closed; and arms connected with said jaws for operating the latter.

12. In a conveying apparatus the combination with the cable, of a traveling gripper carrier; grippers mounted on said carrier; a stationary cam in the path of the grippers for opening the latter to engage the cable; and a stationary cam in the path of said grippers for opening the latter to disengage the cable, and two cams being separated so that a plurality of grippers are maintained always in engagement with the cable, and means to operate the traveling carrier.

13. In a conveying apparatus, a cable, an endless traveling gripper carrier, grippers on said carrier for engaging and driving said cable, means for driving said gripper carrier, means in the path of the gripper carrier for opening the grippers to engage the cable, and independent means in the path of the gripper carrier for opening the grippers to release the cable.

In testimony whereof, I have signed my name to this specification in the presence of two subscribing witnesses, this eighth day September A. D. 1906.

JAMES T. COWLEY.

Witnesses:
DELIA S. PETERSON,
WILLIAM WILCOX.